(12) United States Patent
Jiang et al.

(10) Patent No.: US 11,276,013 B2
(45) Date of Patent: Mar. 15, 2022

(54) METHOD AND APPARATUS FOR TRAINING MODEL BASED ON RANDOM FOREST

(71) Applicant: Alibaba Group Holding Limited, Grand Cayman (KY)

(72) Inventors: Xiaoyan Jiang, Hangzhou (CN); Shaomeng Wang, Hangzhou (CN); Xu Yang, Hangzhou (CN)

(73) Assignee: ALIBABA GROUP HOLDING LIMITED, George Town (KY)

( * ) Notice: Subject to any disclaimer, the term of this patent is extended or adjusted under 35 U.S.C. 154(b) by 657 days.

(21) Appl. No.: 16/146,907

(22) Filed: Sep. 28, 2018

(65) Prior Publication Data

US 2019/0034834 A1    Jan. 31, 2019

Related U.S. Application Data

(63) Continuation of application No. PCT/CN2017/077704, filed on Mar. 22, 2017.

(30) Foreign Application Priority Data

Mar. 31, 2016  (CN) .......................... 201610201626.8

(51) Int. Cl.
*G06N 20/00* (2019.01)
*G06F 16/22* (2019.01)
(Continued)

(52) U.S. Cl.
CPC ......... *G06N 20/00* (2019.01); *G06F 16/2246* (2019.01); *G06N 5/045* (2013.01); *H04L 67/10* (2013.01)

(58) Field of Classification Search
CPC .... G06N 20/00; G06N 5/045; G06F 16/2246; H04L 67/10
(Continued)

(56) References Cited

U.S. PATENT DOCUMENTS

2002/0022956 A1* 2/2002 Ukrainczyk ............ G06F 40/20
704/9
2003/0225749 A1* 12/2003 Cox ........................ G06F 16/35
(Continued)

FOREIGN PATENT DOCUMENTS

CN        103258049 A    8/2013
CN        103473231 A    12/2013
(Continued)

OTHER PUBLICATIONS

Translation of CN Office Action from Corresponding CN Application No. 16146907.8 dated Sep. 4, 2019, a counterpart foreign application for U.S. Appl. No. 16/146,907, 9 pages.
(Continued)

*Primary Examiner* — Umar Cheema
*Assistant Examiner* — Tony Williams

(57) ABSTRACT

Methods and apparatuses for training model based on random forest are provided. The method includes: dividing worker nodes into one or more groups; performing random sampling, by worker nodes in each group, in the preset sample data to obtain the target sample data; and training, by the worker nodes in each group, one or more decision tree objects using the target sample data. Example embodiments of the present disclosure do not need to scan the complete sample data for once, thereby greatly reducing the amount of data to be read, the time cost, and further the iterative update time of the model. The efficiency of training is improved.

14 Claims, 10 Drawing Sheets

(51) Int. Cl.
*G06N 5/04* (2006.01)
*H04L 29/08* (2006.01)
*G06F 9/50* (2006.01)
*G06F 9/48* (2006.01)
*G06N 20/20* (2019.01)
*G06K 9/62* (2006.01)
*H04L 67/10* (2022.01)

(58) Field of Classification Search
USPC .......................................................... 706/12
See application file for complete search history.

(56) References Cited

U.S. PATENT DOCUMENTS

| | | | | |
|---|---|---|---|---|
| 2006/0274763 | A1* | 12/2006 | Error | H04L 67/22 370/400 |
| 2009/0154778 | A1* | 6/2009 | Lei | G06K 9/6247 382/112 |
| 2012/0278321 | A1* | 11/2012 | Traub | G06F 16/3331 707/736 |
| 2015/0074671 | A1 | 3/2015 | Yeddanapudi et al. | |
| 2015/0134626 | A1* | 5/2015 | Theimer | G06F 11/3055 707/693 |
| 2016/0078361 | A1* | 3/2016 | Brueckner | H04L 67/10 706/12 |
| 2016/0132787 | A1* | 5/2016 | Drevo | G06N 20/10 706/12 |

FOREIGN PATENT DOCUMENTS

| | | |
|---|---|---|
| CN | 104392250 A | 3/2015 |
| CN | 104679911 A | 6/2015 |
| CN | 104750800 A | 7/2015 |
| CN | 105303262 A | 2/2016 |
| CN | 105373606 A | 3/2016 |
| JP | 2006236153 A | 9/2006 |

OTHER PUBLICATIONS

Translation of CN Search Report from Corresponding CN Application No. 16146907.8 dated Aug. 28, 2019, a counterpart foreign application for U.S. Appl. No. 16/146,907, 1 page.
Translation of Written Opinion for corresponding PCT Application PCT/CN2017/077704, dated Jun. 30, 2017, a counterpart foreign application for U.S. Appl. No. 16/146,907, 5 pages.
International Preliminary Report on Patentability Chapter I for PCT Application No. PCT/CN2017/077704 dated Oct. 1, 2018.
Liu et al., "Realization of RBM Training Based on Hadoop-GPU", Microelectronics & Computer, Sep. 2015.
Search Report for Taiwanese Application No. 106105770 dated Jun. 25, 2021.
International Search Report for PCT Application PCT/CN2017/077704 dated Jun. 30, 2017.

* cited by examiner

METHOD AND APPARATUS FOR TRAINING MODEL BASED ON RANDOM FOREST

CROSS REFERENCE TO RELATED PATENT APPLICATIONS

This application claims priority to and is a continuation of PCT Patent Application No. PCT/CN 2017/07704, filed on 22 Mar. 2017, which claims priority to Chinese Patent Application No. 201610201626.8, filed on 31 Mar. 2016, and entitled "METHOD AND APPARATUS FOR TRAINING MODEL BASED ON RANDOM FOREST", which are incorporated herein by reference in their entirety.

TECHNICAL FIELD

The present application relates to the technical field of computer processing and, in particular, to methods for training model based on random forest and apparatuses for training model based on random forest.

BACKGROUND

With the rapid development of the Internet, all aspects of people's lives have been linked to the Internet. When people use the relevant functions of the Internet, they generate a large amount of data.

Currently, random forest algorithm is often used for training model and mining massive data to perform operations of classification and recommendation.

The random forest is a collection of tree-type classifiers $\{h(x, k), k=1, \ldots\}$. The meta-classifier h (x, k) is generally a decision tree without pruning, which is constructed by a CART (Classification And Regression Tree) algorithm, where x is an input vector and k is an independently and identically distributed random vector. The random forest determines the growth process of a single tree. The output of the random forest is usually obtained through the majority voting method.

Since the volume of sample data reaches hundreds of millions or even billions of gigabytes, the standalone version of random forest may no longer handle the massive amount of data. As a result, a parallel version of random forest is usually used.

Assuming that a full set of sample data is D, to train 100 decision trees, the parallel implementing scheme is generally as follows:

1. Samples are randomly sampled;
100 worker nodes start at the same time. Each worker node randomly samples a subset S of 20 sample data from D. Generally, S is much smaller than D. A single computer may handle S.

2. A single worker node trains a decision tree using the CART algorithm based on S.

Usually, for a discontinuous feature, when training the decision tree, the Gini coefficient of the feature is calculated, and the split is based on the best Gini coefficient.

In this scheme, since each worker node samples the subset from the full set of sample data, it is necessary to scan the full set of sample data for once. The amount of data to be read is large. Moreover, reading the large amount of data takes a lot of time, making the iterative update time of the model long. Thus, the training efficiency is low.

When calculating the Gini coefficient, the exhaustive method is usually required to be used. That is, assuming that there are n features, and the CART tree is dichotomous, the number of combinations of all branches is $(2^{n-1}-1)$. The Gini coefficient needs to be calculated for $(2^{n-1})$ times, where the complexity is $O(2^{n-1}-1)$. The computational complexity is exponential. Training the decision tree takes a lot of time, making the iterative update time of the model long. Thus, the training efficiency is low.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

The example embodiments of the present disclosure are proposed to provide methods for training model based on random forest and apparatuses for training model based on random forest, which overcome the above problems or at least partially solve the above problems.

To solve the above problems, the example embodiments of the present disclosure disclose methods for training model based on random forest, including:

dividing worker nodes into one or more groups;

performing, by the worker nodes in each group, random sampling in preset sample data to obtain target sample data; and training, by the worker nodes in each group, one or more decision tree objects using the target sample data.

In an example embodiment, the worker nodes in each group include one or more first worker nodes and one or more second worker nodes.

The step of performing, by the worker nodes in each group, random sampling in the preset sample data to obtain the target sample data includes:

reading, by each first worker node in each group, part of sample data from the preset sample data; and randomly distributing, by each first worker node, the read part of sample data to each second worker node, wherein the sample data distributed to the second worker node serve as the target sample data.

In an example embodiment, the step of training, by the worker nodes in each group, one or more decision tree objects using the target sample data includes:

in each group, training, by each second worker node, a decision tree object using the target sample data.

In an example embodiment, the step of training, by the worker nodes in each group, one or more decision tree objects using the target sample data includes:

calculating the weight of a value of attribute information when the value of the attribute information of the target sample data is an enumeration value;

sorting the value of the attribute information according to the weight;

calculating a Gini coefficient using the sorted value of the attribute information; and performing a splitting process on a tree node of the decision tree object according to the Gini coefficient.

In an example embodiment, the step of calculating the weight of the value of the attribute information includes:

calculating the frequency of the value of the attribute information with respect to a classification column when the classification column of the attribute information is dichotomous; and normalizing the frequency to obtain the weight.

In an example embodiment, the step of calculating the weight of the value of the attribute information includes:

calculating a weight probability matrix of the value of the attribute information with respect to the classification column when the classification column of the attribute information is multi-classified, wherein the abscissa of the weight probability matrix is the value of the attribute information, and the ordinate is the value of the classification column;

performing principal component analysis on the weight probability matrix to obtain an eigenvector corresponding to a maximum eigenvalue; and multiplying the weight probability matrix by the eigenvector to obtain the weight.

In an example embodiment, the step of calculating the Gini coefficient using the sorted value of the attribute information includes:

dividing the sorted value of the attribute information into two attribute subsets according to an order of sorting; and calculating the Gini coefficient using the two attribute subsets in sequence.

The example embodiments of the present disclosure also disclose an apparatus for training model based on random forest, including:

a group dividing module, configured to divide the worker nodes into one or more groups;

a random sampling module, configured to perform, by the worker nodes in each group, random sampling in the preset sample data to obtain target sample data; and a decision tree training module, configured to train, by the worker nodes in each group, one or more decision tree objects using the target sample data.

In an example embodiment, the worker nodes in each group include one or more first worker nodes and one or more second worker nodes.

The random sampling module includes:

a partial data reading submodule, configured to read, by each first worker node in each group, part of sample data in the preset sample data; and a random data distribution submodule, configured to randomly distribute, by each first worker node, the read part of the sample data to each second worker node, wherein the sample data distributed to the second worker node serve as the target sample data.

In an example embodiment, the decision tree training module includes:

a node training submodule, configured to train, by each second worker node in each group, a decision tree object using the target sample data.

In an example embodiment, the decision tree training module includes:

a weight calculation submodule, configured to calculate, the weight of attribute information when a value of the attribute information of the target sample data is an enumerated value;

a sorting submodule, configured to sort the value of the attribute information according to the weight;

a Gini coefficient calculation submodule, configured to calculate a Gini coefficient using the sorted value of the attribute information; and a splitting submodule, configured to perform a splitting process on a tree node of the decision tree object according to the Gini coefficient.

In an example embodiment, the weight calculation submodule includes:

a frequency calculation unit, configured to calculate the frequency of the value of the attribute information with respect to a classification column when the classification column of the attribute information is dichotomous; and a normalization unit, configured to normalize the frequency to obtain the weight.

In an example embodiment, the weight calculation submodule includes:

a weight probability matrix calculation unit, configured to calculate a weight probability matrix of the value of the attribute information with respect to the classification column when the classification column of the attribute information is multi-classified, wherein an abscissa of the weight probability matrix is the value of the attribute information, and an ordinate is the value of the classification column;

a principal component analysis unit, configured to perform principal component analysis on the weight probability matrix to obtain an eigenvector corresponding to a maximum eigenvalue; and a weight obtaining unit, configured to multiply the weight probability matrix by the eigenvector to obtain the weight.

In an example embodiment, the Gini coefficient calculation submodule includes:

a subset dividing unit, configured to divide the sorted value of the attribute information into two attribute subsets according to an order of sorting; and a subset calculation unit, configured to calculate the Gini coefficient using the two attribute subsets in sequence.

The example embodiments of the present disclosure include the following advantages:

The example embodiments of the present disclosure divide worker nodes into one or more groups. Worker nodes in each group randomly sample the preset sample data to obtain the target sample data, and then train the decision tree object. Therefore, worker nodes in each group only read part of the sample data, and do not need to scan the complete sample data for once, thereby greatly reducing the amount of data to be read, the time cost, and further the iterative update time of the model. The efficiency of training is improved.

Regarding attributes with enumeration values, the example embodiments of the present disclosure calculate the splitting points by the importance sorting method, without performing exhaustive enumeration, thereby greatly reducing the computational cost of the splitting points. Assuming that attributes have n values, and the splitting points are calculated by the importance sorting method, the computational complexity may be reduced from $O(2^{n-1}-1)$ of the exhaustive method to $O(n)$, thereby reducing the training time cost and further the iterative update time of model. The training efficiency is improved.

BRIEF DESCRIPTION OF DRAWINGS

The accompanying drawings described here are used to provide a further understanding of the present disclosure, and constitute a part of the present disclosure. The example embodiments of the present disclosure and their illustrations are used to explain the present disclosure, and are not intended to improperly limit the present disclosure. In the accompanying drawings.

DETAILED DESCRIPTION

In order to make the above purpose, characteristics, and advantages of the present disclosure more clear and understandable, hereinafter, the present disclosure is further described in detail with reference to the drawings and example embodiments.

Figure 1:
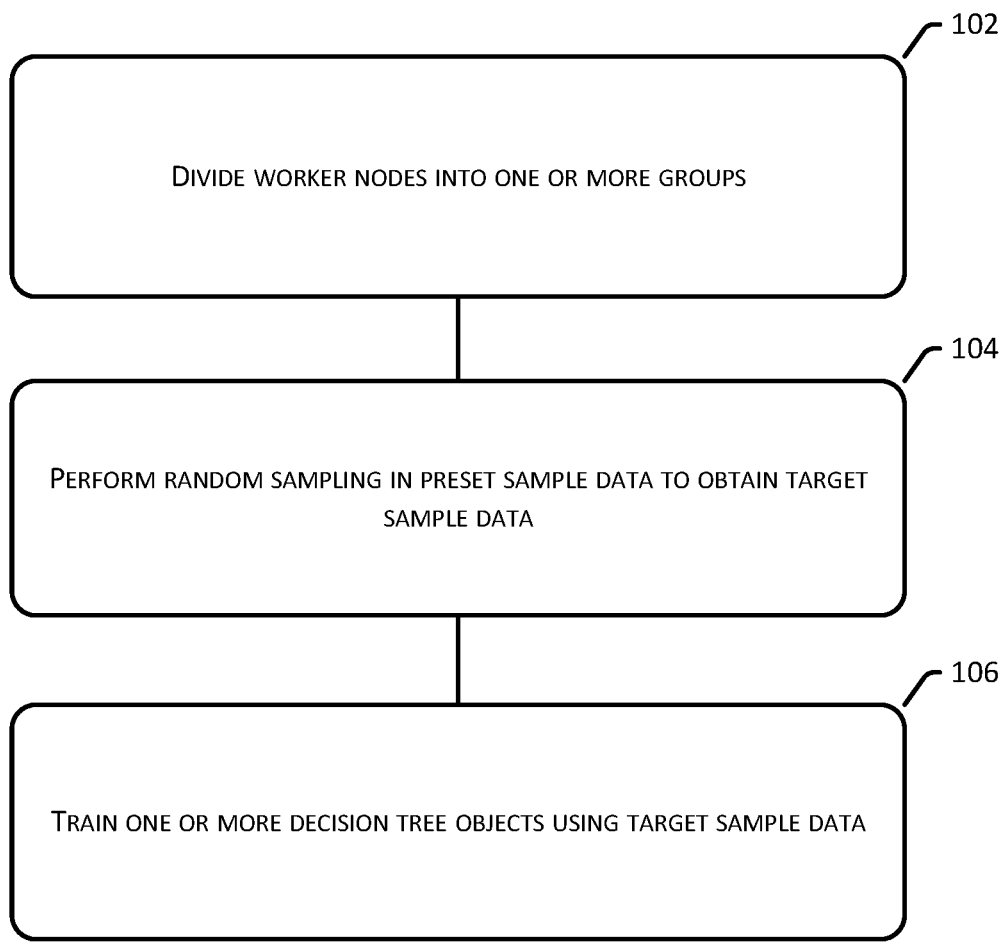
FIG. 1 is an example flowchart of steps of a method for training model based on random forest of an example embodiment of the present disclosure.

Referring to FIG. 1, a flowchart of a method for training model based on random forest of an example embodiment of the present disclosure is shown, which may include the following steps:

Step 102, worker nodes are divided into one or more groups.

In example embodiments of the present disclosure, the worker node may be the computational node of a training model, may be deployed on a single computer, or may be applied on a computer cluster, such as a distributed system. Example embodiments of the present disclosure are not limited thereto.

For a single computer, the worker node may be the core of the CPU (Central Processing Unit). For a computer cluster, the worker node may be a single computer.

Figure 2:
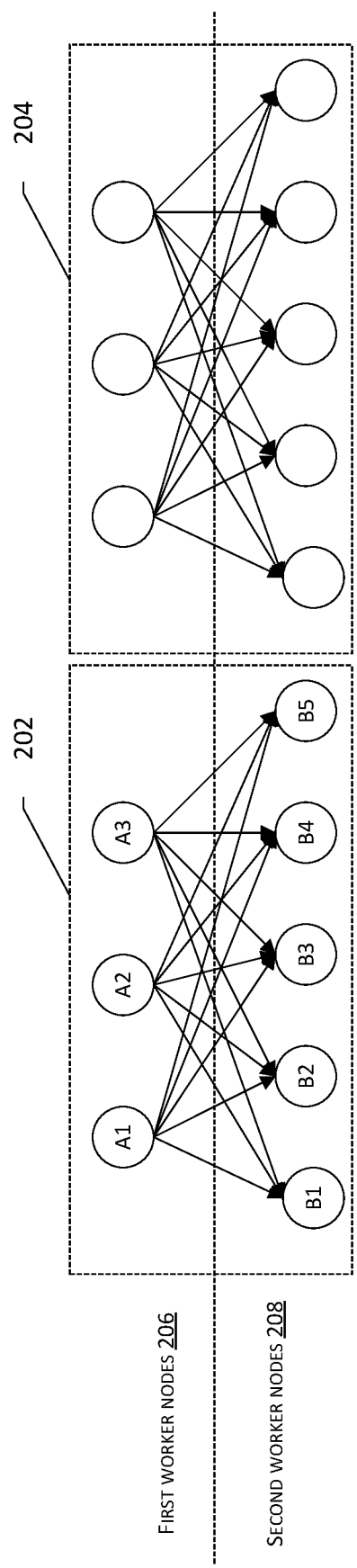
FIG. 2 is an example diagram of groups of an example embodiment of the present disclosure.

In example embodiments of the present disclosure, worker nodes may be divided into one or more groups 202 and 204 (portions denoted by dotted boxes) according to the data size of the sample data and the number of decision trees, as shown in FIG. 2. Worker nodes in each group 202 or 204 include one or more first worker nodes 206 (A1, A2, and A3) and one or more second worker nodes 208 (B1, B2, B3, B4, and B5.

Each group 202 or 204 is responsible for processing a complete set of sample data. For example, the first worker nodes 206 (A1, A2, and A3) in the group 202 randomly distributes the sample data to the second worker nodes 208 (B1, B2, B3, B4, and B5. The second worker nodes 208 (B1, B2, B3, B4, and B5 train the decision tree using the distributed sample data.

In general, taking the system capacity and speed of operation into consideration, the number of groups is proportional to the number of decision tree objects. For example, the number of groups=the number of decision trees/100.

Within a single group, the number of first worker nodes 206 is proportional to the amount of sample data. a second worker node 208 trains a decision tree.

In order to enable those skilled in the art to better understand example embodiments of the present disclosure, Hadoop is described as an example embodiment of the computer cluster in the example embodiment of the present disclosure.

The Hadoop mainly includes two parts, wherein one is a distributed file system (Hadoop Distributed File System, HDFS), and the other is a distributed computing framework, namely, MapReduce.

HDFS is a highly fault-tolerant system that provides high-throughput data access, and thus is suitable for applications with large datasets.

MapReduce is a programming model that extracts analysis elements from massive source data and finally returns a result set. The basic principle may be as follows. Large data analysis is divided into small blocks that are analyzed one by one. Finally, the extracted data is summarized and analyzed.

In Hadoop, there are two machine roles that are used to perform MapReduce. One is JobTracker, and the other is TaskTracker. JobTracker may be used to schedule the work, and TaskTracker may be used to perform the work.

Further, in Hadoop, the TaskTracker may refer to a processing node of the distributed system. The processing node may include one or more Map nodes and one or more Reduce nodes.

In the distributed calculation, MapReduce is responsible to deal with the complex issues in parallel programming such as distributed storage, work scheduling, load balancing, fault-tolerant equalization, fault-tolerant processing, and network communication. The process is highly abstracted into two functions, i.e., the map function and the reduce function. The map function may divide the task into multiple tasks, and the reduce function may aggregate results of the divided multitasking.

In Hadoop, each MapReduce task may be initialized as a Job. Each Job may be divided into two phases, i.e., the map phase and the reduce phase. These two phases are represented by two functions, namely, the map function and the reduce function.

The map function may receive an input in the form of <key, value> and then also produce an output in the form of <key, value>. The Hadoop function may receive an input in the form of <key, (list of values)>, and then process this value set. Each reduce function produces 0 or 1 output. The output of the reduce function is also in the form of <key, value>.

For a group, the first worker node may be a Map node, and the second worker node may be a Reduce node.

Step 104: worker nodes in each group perform random sampling in the preset sample data to obtain the target sample data.

In an implementation, in each group, the preset sample data, i.e., the full set of sample data, are read. That is, part of sample data, i.e., a subset of sample data, in the preset sample data may be read by each first worker node.

Each first worker node randomly distributes the read part of sample data to each second worker node. The sample data distributed to the second worker node serve as the target sample data.

For each piece of sample data, each first worker node reads once. However, whether the data will be distributed to the second worker node is not sure. That is, the random distribution (sampling) is performed.

For example, as shown in FIG. 2, a certain piece of sample data is read by the first worker node A1. A random value is generated for second worker nodes B1, B2, B3, B4, and B5, respectively. If the random value is greater than 0.5, the sample data is distributed to the second worker node (B1, B2, B3, B4, and B5. Otherwise, the sample data is not distributed to the second worker node (B1, B2, B3, B4, and B5. For this piece of sample data, it is randomly distributed five times (the number of second worker nodes B1, B2, B3, B4, and B5.

Similarly, the sample data read by first worker nodes A2 and A3 may also be randomly distributed to second worker nodes B1, B2, B3, B4, and B5.

Figure 3:
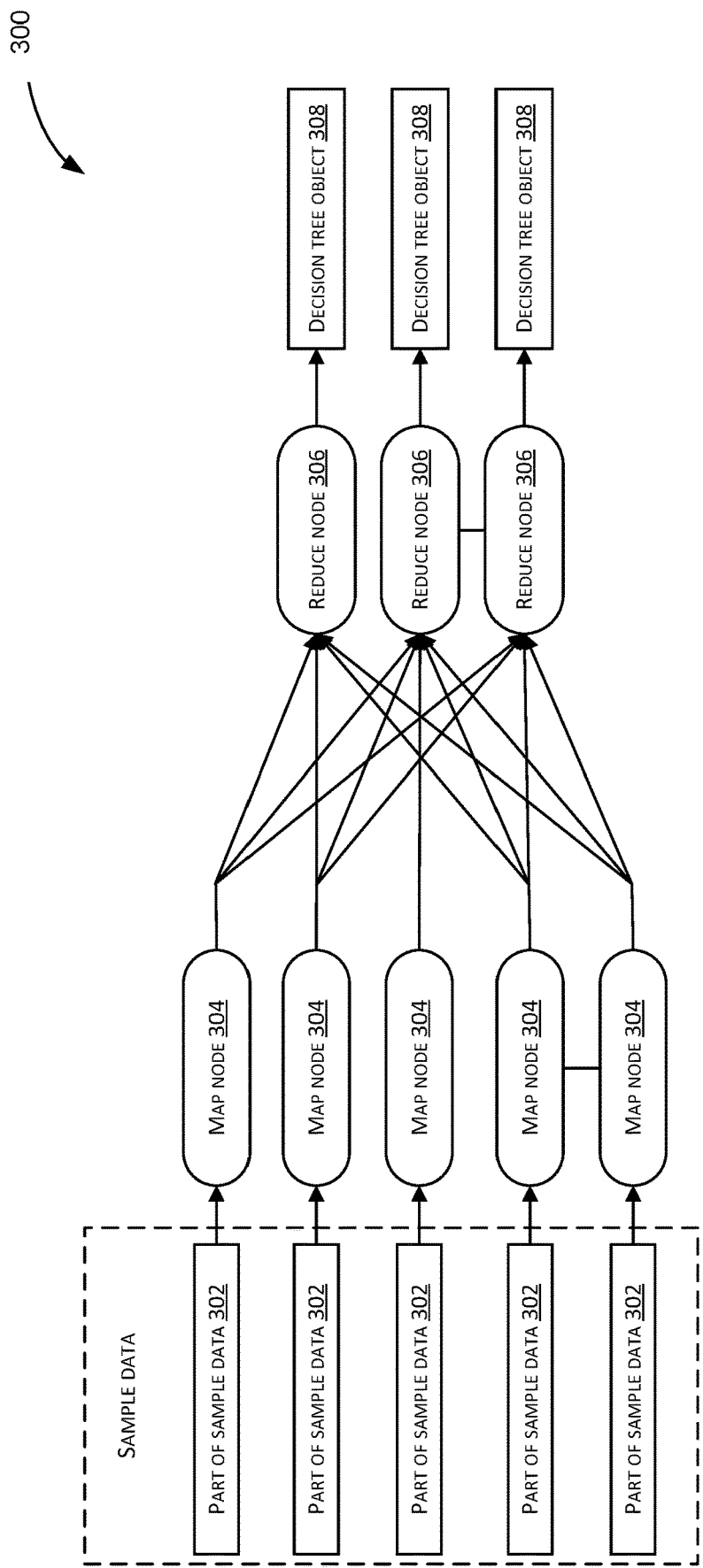
FIG. 3 is an example diagram of a process of model training in a Hadoop group of an example embodiment of the present disclosure.

As shown in FIG. 3, in Hadoop 300, Map nodes 304 and Reduce nodes 306 in a group process a complete set of sample data. Each Map node 304 reads part of the sample data and distributes the sample data randomly to the Reduce node 306.

That is, in the Map node 304, the map function may be defined as random distribution, so as to distribute the sample data of the Map node 304 to the Reduce node 306.

The Map node 304 extracts key-value pairs from the input sample data. Each key-value pair is passed to the map function as a parameter. Intermediate key-value pairs generated by the map function are cached in the memory.

The output of the map function in the Map node 304 is processed by the MapReduce framework and finally distributed to the reduce function in the Reduce node 306.

Step 106: worker nodes in each group train one or more decision tree objects using the target sample data.

Each piece of sample data usually includes a sample object, one or more pieces of attribute information, and a classification tag. The sample data after the random sampling is a data set, which is generally in the form of a two-dimensional array, namely, including a set of sample objects, one or more sets of attribute information, and a set of classification labels (also called the classification column).

An example of the target sample data is shown in the following table:

Attribute information includes body temperature, surface coverage, viviparous, oviparous, volitant, aquatic, legged, and hibernating.

A decision tree (object) is a tree structure composed of nodes and directed edges. During the training, each non-leaf node is classified for a certain attribute.

In an example implementation, in each group, each second worker node trains a decision tree object using the target sample data.

As shown in FIG. 3, in Hadoop 300, if the part of the sample data 302 read by the Map node 304 is randomly distributed to the Reduce node 306, the Reduce node 306 may use the distributed sample data (i.e., the target sample data) to train the decision tree 308.

When training the decision tree, each non-leaf node is split for a certain attribute. The process is iterated until samples on each leaf node are in a single category or each attribute is selected. The leaf node represents classification results. The complete path from the root node to the leaf node represents a decision process. The nature of the training of decision tree is how to split nodes.

The decision tree obtained by training is generally a binary tree. In a few cases, there is also a non-binary tree. The training process is as follows:

(1) The root node of the decision tree is constructed as a set of all target training sample data T.

(2) The most discriminating attribute in T is selected by calculating the information gain or the Gini coefficient. The node is split to form the left and right child nodes.

(3) In the remaining attribute space, the process of Step 2 is repeated for the sample data of each child node. If one of the following conditions is satisfied, the node is marked as a leaf node and the node splitting ends:

a. All sample data on this node belong to the same classification;
  b. No remaining attribute may be used to split;
  c. The number of sample data in the current data set is less than a given value; and
  d. The depth of the decision tree is greater than a set value.

Example embodiments of the present disclosure divide worker nodes into one or more groups. Worker nodes in each group randomly sample the preset sample data to obtain the target sample data, and then trains the decision tree object. Therefore, worker nodes in each group only read part of the

TABLE 1

| Sample objects | Body temperature | Surface coverage | Viviparous | Oviparous | Volitant | Aquatic | Legged | Hibernating | Classification column |
|---|---|---|---|---|---|---|---|---|---|
| Human | Constant temperature | Hair | Yes | No | No | No | Yes | No | Mammals |
| Huge python | Cold blood | Flakes | No | Yes | No | No | No | Yes | Reptiles |
| Salmon | Cold blood | Flakes | No | Yes | No | Yes | No | No | Fish |
| Whale | Constant temperature | Hair | Yes | No | No | Yes | No | No | Mammals |
| Frog | Cold blood | None | No | Yes | No | Sometimes | Yes | Yes | Amphibian |
| Huge lizard | Cold blood | Flakes | No | Yes | No | No | Yes | No | Reptiles |
| Bat | Constant temperature | Hair | Yes | No | Yes | No | Yes | No | Mammals |
| Cat | Constant temperature | Fur | Yes | No | No | No | Yes | No | Mammals |
| Leopard shark | Cold blood | Flakes | Yes | No | No | Yes | No | No | Fish |
| Turtle | Cold blood | Flakes | No | Yes | No | Sometimes | Yes | No | Reptiles |
| Porcupine | Constant temperature | Bristle | Yes | No | No | No | Yes | Yes | Mammals |
| Eel | Cold blood | Flakes | No | Yes | No | Yes | No | No | Fish |
| Salamander | Cold blood | None | No | Yes | No | Sometimes | Yes | Yes | Amphibian | sample data, and do not need to scan the complete sample data for once, thereby greatly reducing the amount of data to be read, the time cost, and further the iterative update time of the model. The efficiency of training is improved.

Figure 5:
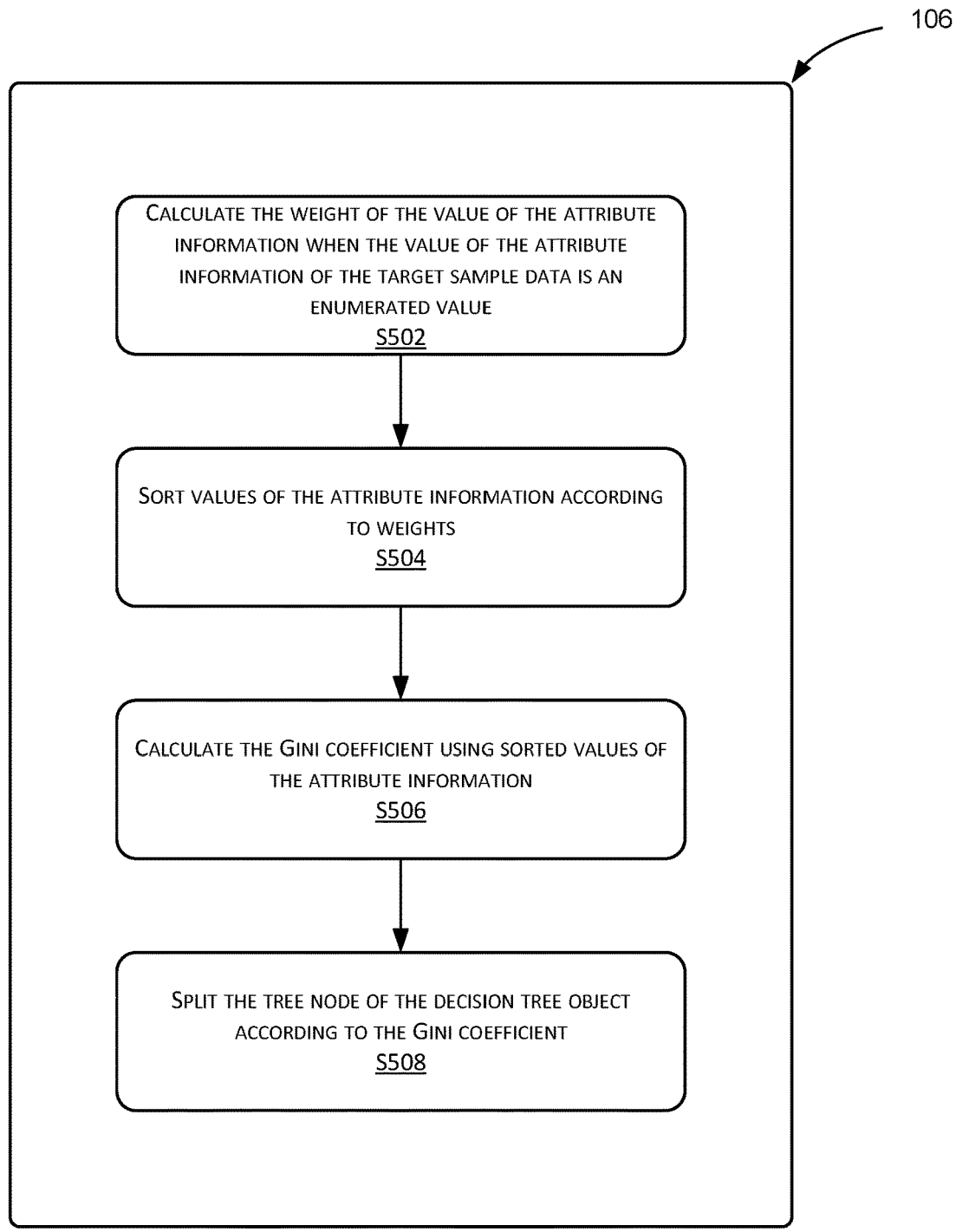
FIG. 5 is an example flowchart of sub-steps of Step 106 of the method for training model based on random forest of an example embodiment of the present disclosure.

Referring to FIG. 5, in an example embodiment of the present disclosure, Step 106 may include the following sub-steps:

Sub-step S502, when the value of the attribute information of the target sample data is an enumerated value, the weight of the value of the attribute information is calculated;

In practical implementations, the value of the attribute information is generally categorized into continuous values and enumerated values. The enumerated value is also called discrete value, i.e., discontinuous value.

For example, values of the body temperature in Table 1 are cold blood and constant temperature, which belong to enumerated values.

In example embodiments of the present disclosure, for the attribute information with enumerated values, the optimal splitting point is calculated by its importance (weight) sorting, so as to increase the speedup ratio.

In an example, when the classification column of the attribute information is dichotomy (i.e., with two classifications), the frequency of the value of the attribute information with respect to the classification column is calculated. The frequency is normalized to get the weight.

In another example, when the classification column of the attribute information is multi-classified (i.e., with three or more classifications), the weight probability matrix of the value of the attribute information with respect to the classification column is calculated. The abscissa of the weight probability matrix is the value of the attribute information, and the ordinate is the value of the classification column.

The principal component analysis (PCA) is performed on the weight probability matrix to obtain the eigenvector corresponding to the maximum eigenvalue. The weighted probability matrix is multiplied by the eigenvector to obtain the weight.

Sub-step S504, values of the attribute information are sorted according to weights.

In an example implementation, values of the attribute information may be sorted in a sequential order according to weights, and may also be sorted in a reverse order. Example embodiments of the present disclosure are not limited thereto.

Sub-step S506, the Gini coefficient is calculated using sorted values of the attribute information.

The Gini coefficient may be used to split nodes of the decision tree. The more disordered the categories contained within the overall sample, the larger the Gini index.

In practical applications, sorted values of the attribute information may be divided into two attribute subsets in an order of sorting.

Assuming that the sequence of values of ordered attribute information obtained by the weight sorting is f=(a1, a2, a3 ... an), a left subtree (attribute subset) of $a_1 \sim a_i$ and a right subtree (attribute subset) of $a_{i+1} \sim a_n$ may be divided, where i=1, 2, ..., n−1.

Two attribute subsets are used in sequence to calculate the Gini coefficient.

Assuming that there are k classifications, and the probability that the sample data belong to a classification i is pi, the Gini index is defined as:

$$Gini = \sum_{i=1}^{k} p_i(1-p_i) = 1 - \sum_{i=1}^{k} p_i^2$$

If the data set D is divided into two parts $D_1$ and $D_2$, under this condition, the Gini gain of the set D is defined as:

$$Gini(D) = \frac{|D_1|}{|D_2|} Gini(D_1) + \frac{|D_2|}{|D_1|} Gini(D_2)$$

Sub-step S508, the tree node of the decision tree object is split according to the Gini coefficient.

The Gini index indicates the uncertainty of the data set. The larger the Gini index, the greater the uncertainty of the sample belonging to a certain classification. Therefore, the best choice of feature partitioning is the one that makes the Gini index of the data set the smallest.

Regarding attributes with the enumeration values, example embodiments of the present disclosure calculate the splitting points by the importance sorting method without performing exhaustive enumeration, thereby greatly reducing the computational cost of the splitting points. Assuming that attributes have n values and the splitting points are calculated by the importance sorting method, the computational complexity may be reduced from $O(2^{n-1}-1)$ of the exhaustive method to $O(n)$, reducing the training time cost and further the iterative update time of model. The training efficiency is improved.

It should be noted that, for example embodiments of the method, they are all described as a combination of a series of actions, so as to keep the simplicity of the description. However, a person of ordinary skill in the art should be aware that the present disclosure is not limited by the sequence of actions described. Because according to example embodiments of the present disclosure, certain steps may be performed in other orders or simultaneously. Second, A person of ordinary skill in the art should also be aware that example embodiments described in the specification are example embodiments, and actions involved therein are not necessarily essential for example embodiments of the present disclosure.

Figure 4:
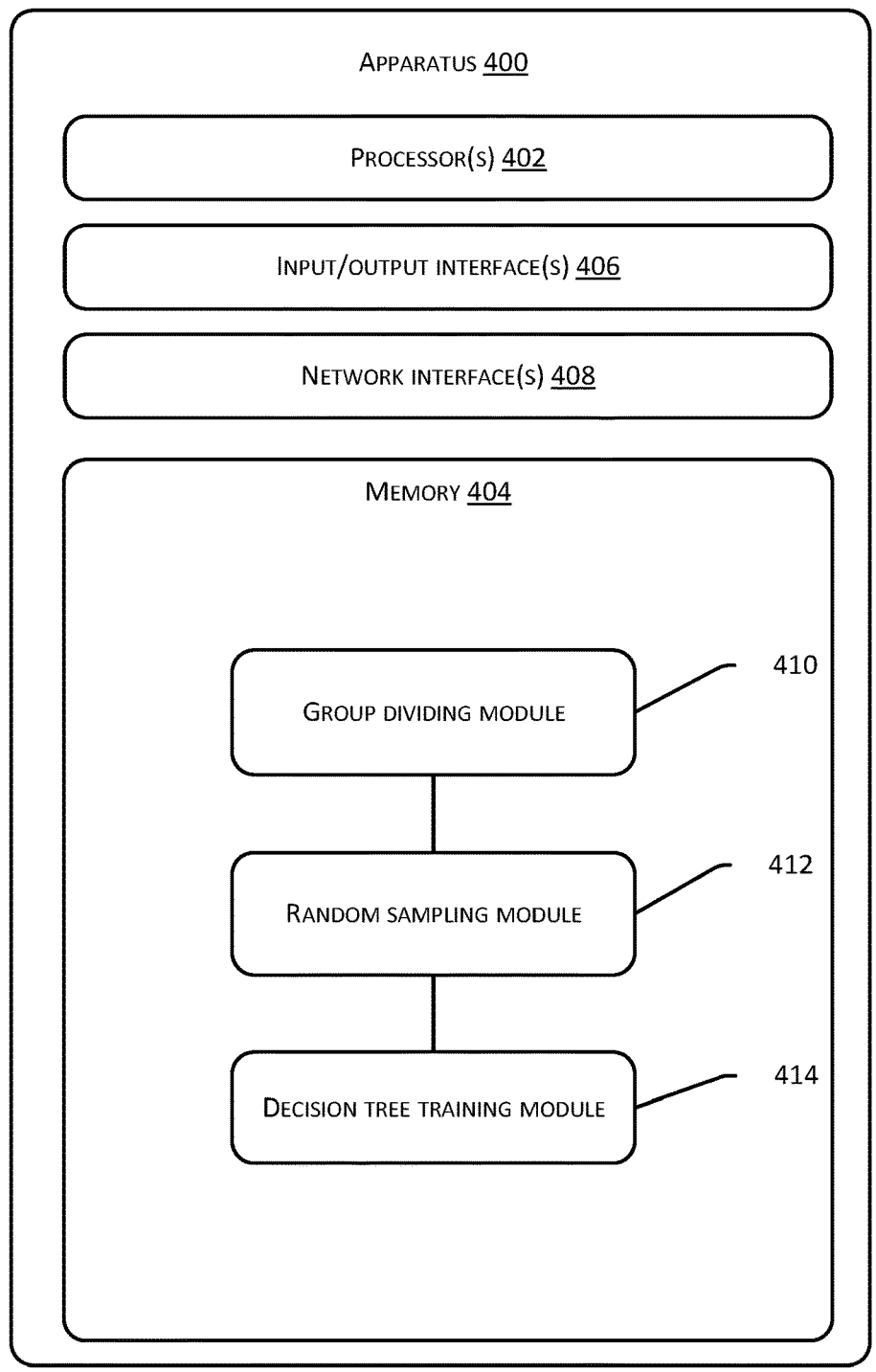
FIG. 4 is an example structural block diagram of an apparatus for training model based on random forest of an example embodiment of the present disclosure.

Referring to FIG. 4, an apparatus for training model based on random forest of an example embodiment of the present disclosure is shown. The apparatus 400 includes one or more processor(s) 402 or data processing unit(s) and memory 404. The apparatus 400 may further include one or more input/output interface(s) 406 and one or more network interface(s) 408. The memory 402 is an example of computer-readable media.

The memory 402 may store therein a plurality of modules or units including:

A group dividing module 410, configured to divide worker nodes into one or more groups;

A random sampling module 412, configured to randomly sample the preset sample data by the worker node in each group to obtain the target sample data; and A decision tree training module 414, configured to train one or more decision tree objects using the target sample data by the worker node in each group.

In an example embodiment of the present disclosure, worker nodes in each group include one or more first worker nodes and one or more second worker nodes.

Figure 6:
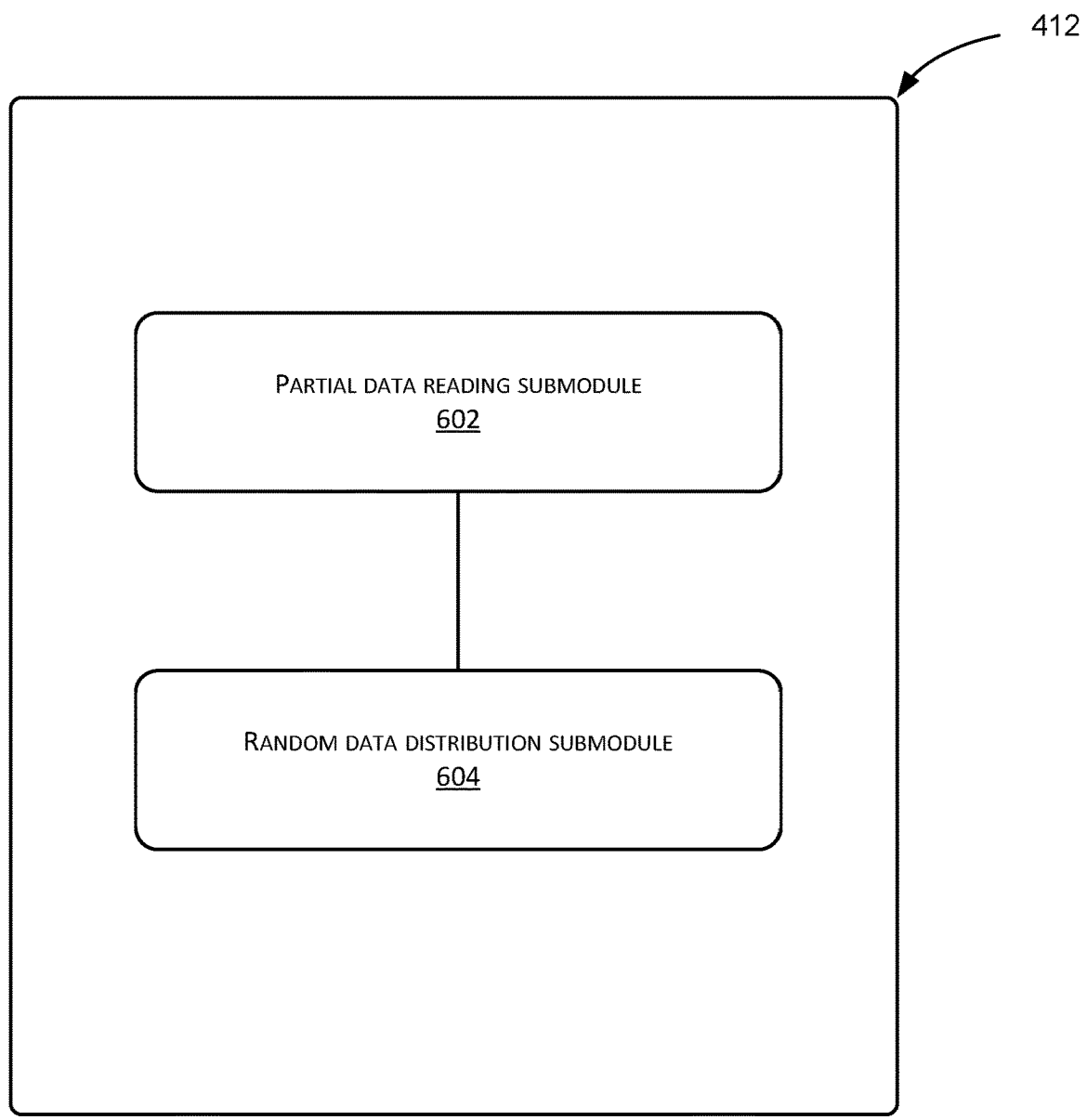
FIG. 6 is an example structural block diagram of the random sampling module 412 of the apparatus for training model based on random forest of an example embodiment of the present disclosure.

Referring to FIG. 6, the random sampling module 412 may include the following submodules:

A partial data reading submodule 602, configured such that, in each group, each first worker node reads part of the sample data in the preset sample data; and A random data distribution submodule 604, configured such that each first worker node randomly distributes the read part of sample data to each second worker node. The sample data distributed to the second worker node serve as the target sample data.

Figure 7:
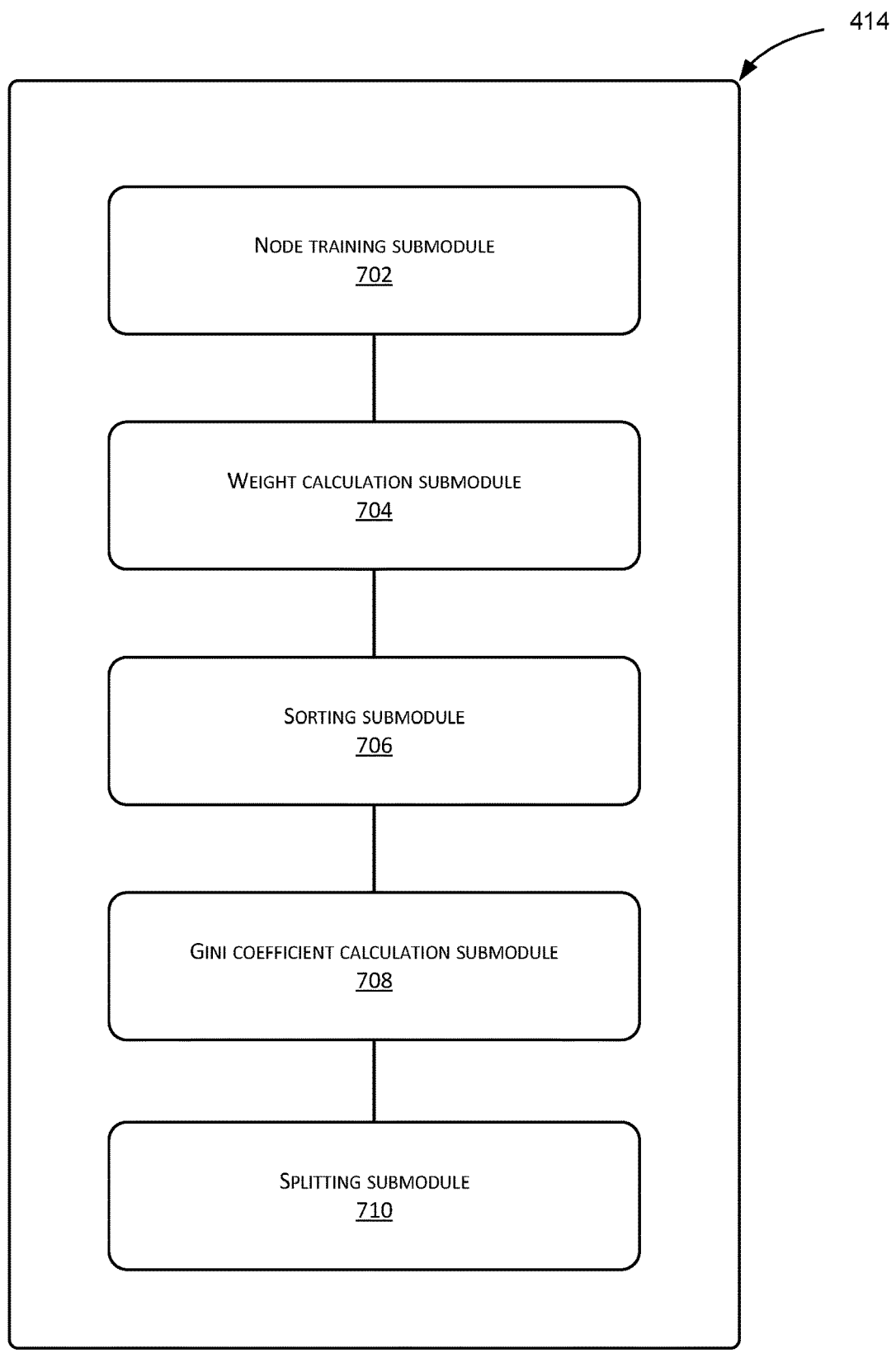
FIG. 7 is an example structural block diagram of the decision tree training module 414 of the apparatus for training model based on random forest of an example embodiment of the present disclosure.

Referring to FIG. 7, in an example embodiment of the present disclosure, the decision tree training module 414 may include the following submodule:

A node training submodule 702, configured that such that, in each group, each second worker node trains a decision tree object using the target sample data.

In an example embodiment of the present disclosure, the decision tree training module 414 may include the following submodules:

A weight calculation submodule 704, configured to calculate the weight of the attribute information when the value of the attribute information of the target sample data is an enumeration value;

A sorting submodule 706, configured to sort the value of the attribute information according to the weight;

A Gini coefficient calculation submodule 708, configured to calculate the Gini coefficient using the sorted value of the attribute information; and A splitting submodule 710, configured to split the tree node of the decision tree object according to the Gini coefficient.

Figure 8:
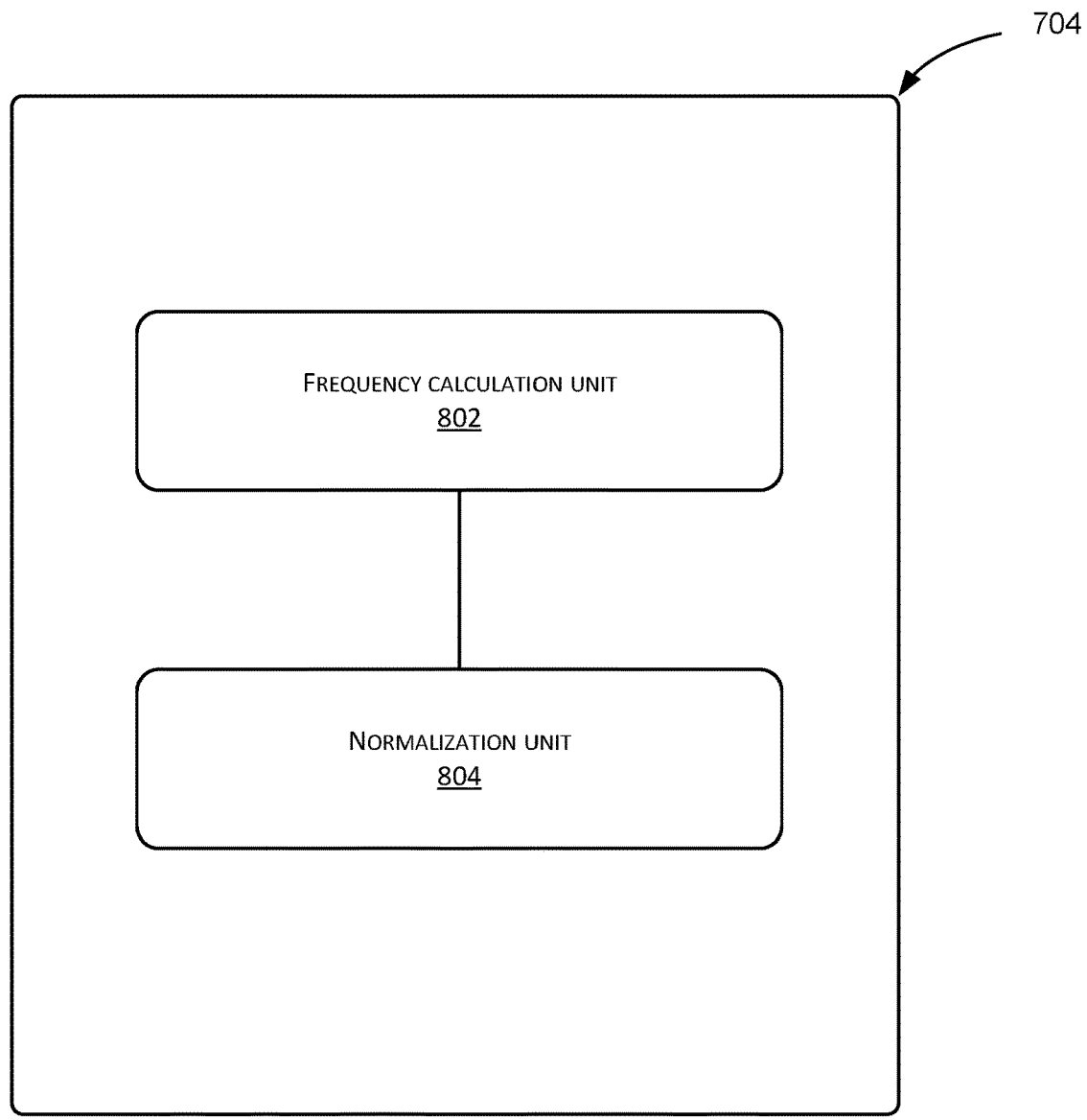
FIG. 8 is an example structural block diagram of the weight calculation submodule 704 of the apparatus for training model based on random forest of an example embodiment of the present disclosure.

Referring to FIG. 8, in an example embodiment of the present disclosure, the weight calculation submodule 704 may include the following units:

A frequency calculation unit 802, configured to calculate the frequency of the value of the attribute information with respect to the classification column when the classification column of the attribute information is dichotomous; and A normalization unit 804, configured to normalize the frequency to obtain the weight.

Figure 9:
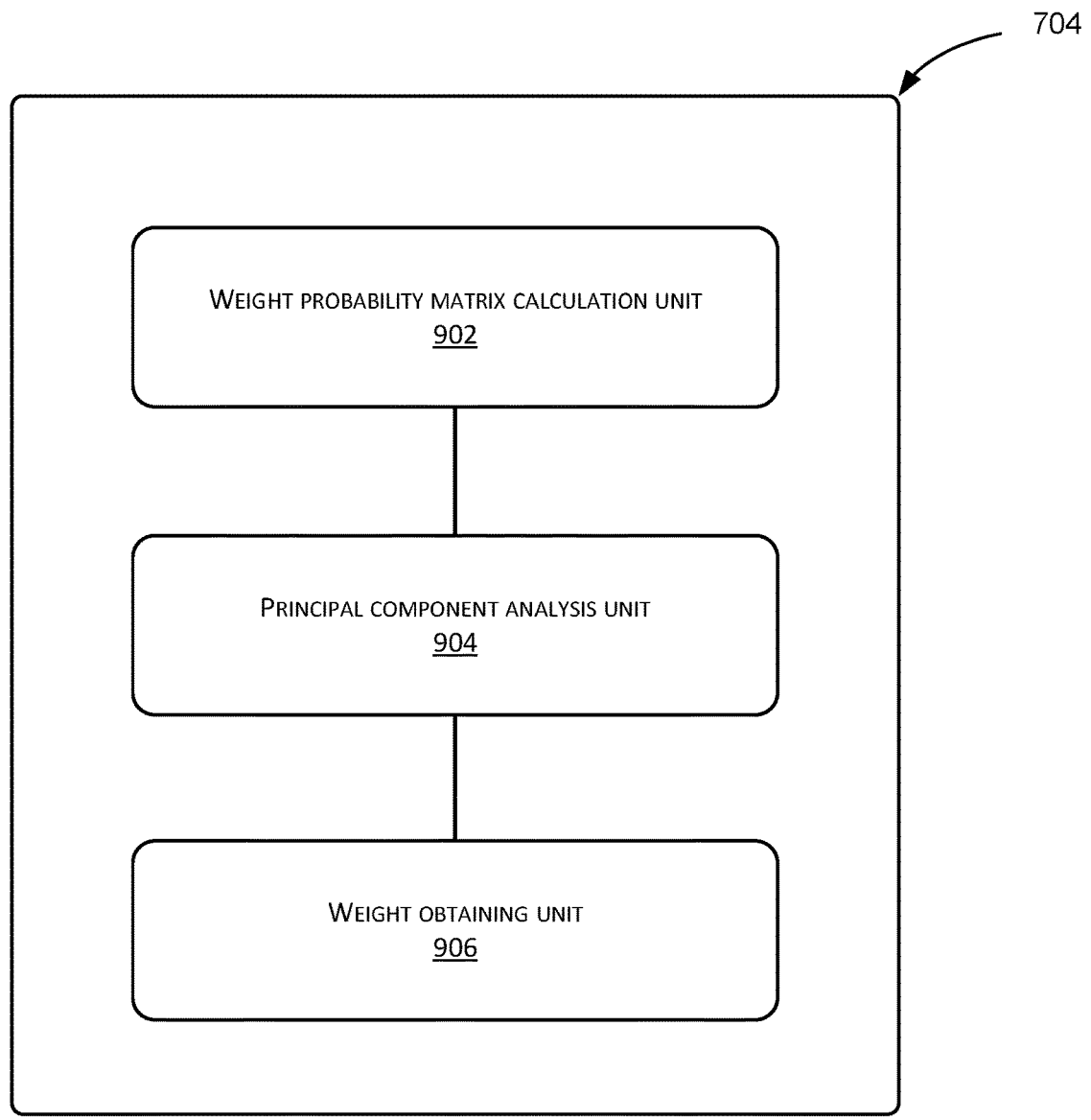
FIG. 9 is another example structural block diagram of the weight calculation submodule 704 of the apparatus for training model based on random forest of an example embodiment of the present disclosure.

Referring to FIG. 9, in another example embodiment of the present disclosure, the weight calculation submodule 704 may include the following units:

A weight probability matrix calculation unit 902, configured to calculate the weight probability matrix of the value of the attribute information with respect to the classification column when the classification column of the attribute information is multi-classified, wherein the abscissa of the weight probability matrix is the value of the attribute information, and the ordinate is the value of the classification column;

A principal component analysis unit 904, configured to perform principal component analysis on the weight probability matrix to obtain an eigenvector corresponding to the maximum eigenvalue;

A weight obtaining unit 906, configured to multiply the weight probability matrix by the eigenvector to obtain the weight.

Figure 10:
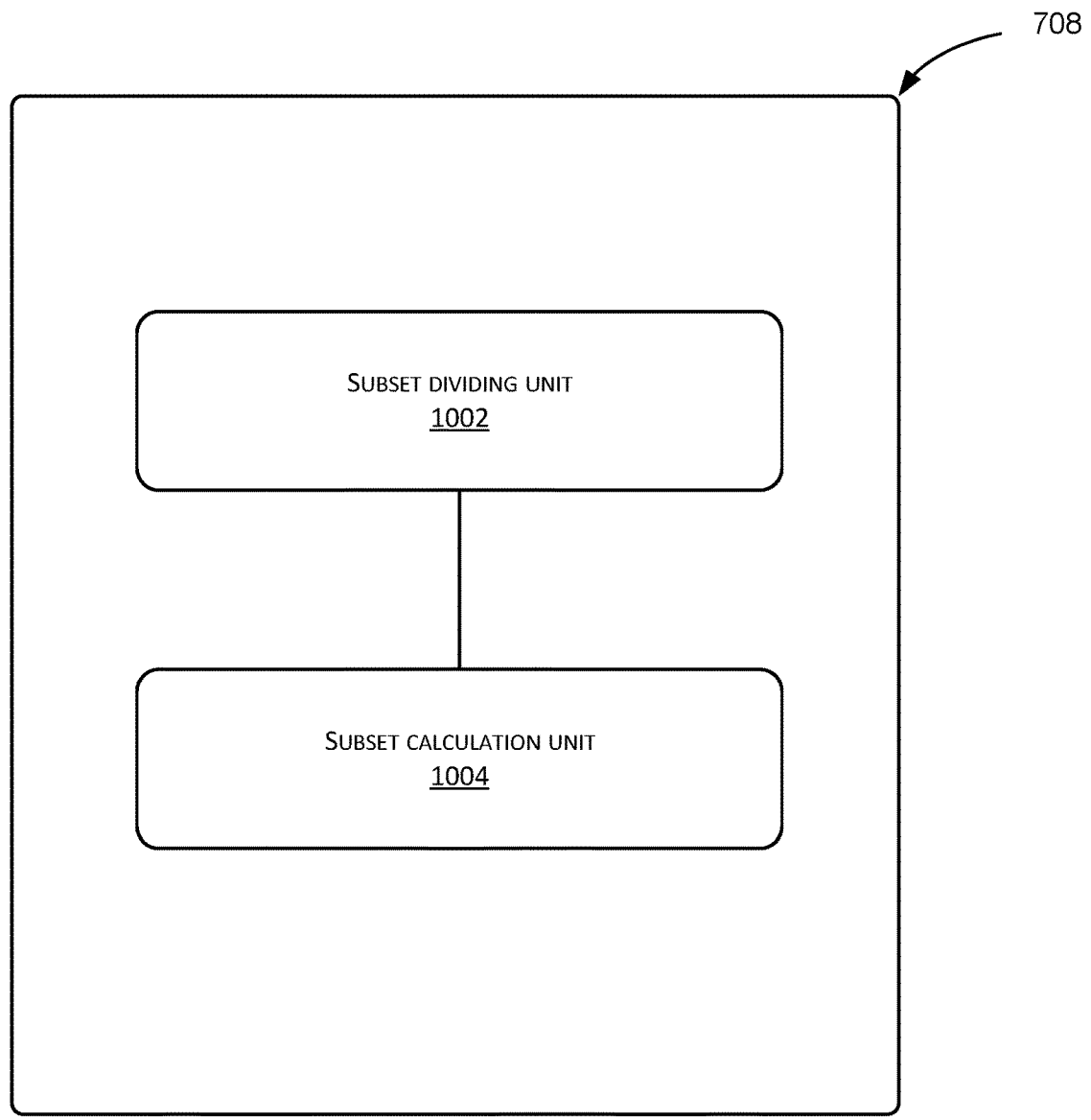
FIG. 10 is an example structural block diagram of the Gini coefficient calculation submodule 708 of the apparatus for training model based on random forest of an example embodiment of the present disclosure.

Referring to FIG. 10, in an example embodiment of the present disclosure, the Gini coefficient calculation submodule 708 may include the following units:

A subset dividing unit 1002, configured to sequentially sort the sorted value of the attribute information into two attribute subsets according to the sorting order; and A subset calculation unit 1004, configured to use the two attribute subsets in sequence to calculate the Gini coefficient.

For the example embodiment of the apparatus, since it is basically similar to the example embodiment of the method, the description is relatively simple. For related parts, descriptions regarding the example embodiment of the method can be referred to.

Each example embodiment in this specification is described in a progressive manner. Each example embodiment highlights differences with respects to other example embodiments. The same and similar parts can be referred to for each embodiment.

A person of ordinary skill in the art should understand that the implementation of an example embodiment of the present disclosure may be provided as a method, an apparatus, or a computer program product. Therefore, the present disclosure may use forms of a complete hardware embodiment, a software embodiment, or an embodiment of a combination of software and hardware aspects. Also, example embodiments of the present disclosure may use the form of a computer program product applied on one or more computer-readable media (including but not limited to disk storage, CD-ROM, optical memory, etc.) containing computer program code.

In a typical configuration, the computer device includes one or more processors (CPU), input/output interfaces, network interfaces, and memories. The memory may include different forms of computer-readable medium such as non-permanent memory, Random Access Memory (RAM), and/or non-volatile memory, for example, Read Only Memory (ROM) or flash memory. The memory is an example of the computer-readable medium. The computer-readable medium includes permanent and non-permanent, removable and non-removable media, which may be implemented by any method or technology. The information may be a computer-readable instruction, a data structure, a module of program, or other data. Examples of computer-readable media include, but are not limited to, phase change memory (PRAM), Static Random Access Memory (SRAM), Dynamic Random Access Memory (DRAM), other types of Random Access Memory (RAM), Read Only Memory (ROM), Electrically Erasable Programmable Read Only Memory (EEPROM), Flash memory or other memory technology, Read Only Disc Read Only Memory (CD-ROM), Digital Versatile Disc (DVD) or other optical storage, magnetic tape cassette, tape magnetic disk storage, or other magnetic storage devices, or any other non-transmission media, which may be used to store information accessible by the computing device. As defined herein, the computer-readable medium does not include transitory medium, such as modulated data signal and carrier.

Example embodiments of the present disclosure are described with reference to the flowchart and/or block diagram of the method, the terminal device (system), and the computer program product according to example embodiments of the present disclosure. It should be understood that the flowchart and/or the block diagram, each process and/or block, and a combination of processes and/or blocks in the flowchart and/or the block diagram can be implemented by computer program instructions. These computer program instructions may be provided to a general-purpose computer, a special-purpose computer, an embedded processor, or a processor of other programmable data processing terminal device to generate a machine. Thus, instructions executed by the computer or the processor of other programmable data processing terminal device can produce a device, which implements functions specified by one or more processes in the flowchart and/or one or more blocks in the block diagram.

These computer program instructions may also be stored in a computer-readable memory, which is capable of guiding a computer or other programmable data processing terminal device to operate in a manner, such that instructions stored in the computer-readable memory can produce a manufacturing article including the instruction device, which implements functions specified by one or more processes in the flowchart and/or one or more blocks in the block diagrams.

These computer program instructions may also be loaded onto the computer or other programmable data processing terminal device such that a series of operating steps are performed on the computer or other programmable terminal devices to generate computer-implemented processes. Thus, instructions that are executed by the computer or other programmable terminal devices can provide steps for implementing functions specified by one or more processes in the flowchart and/or one or more blocks in the block diagrams.

Although the example embodiments of the present disclosure have been described, once a person of ordinary skill in the art understands the basic inventive concept, additional changes and modifications may be made to these example embodiments. Therefore, the appended claims are intended to be interpreted as including example embodiments and all changes and modifications that fall within the scope of the present disclosure.

Finally, it should also be noted that in this context, relational terms such as the first and the second, are only used to distinguish one entity or operation from another entity or operation, but do not necessarily require or imply that there is any such actual relationship or sequence between these entities or operations. Also, terms "include", "comprise", or any other variations thereof are intended to cover non-exclusive inclusions, such that the process, the method, the article, or the terminal device that includes a series of elements not only includes those elements, but also includes other elements without being explicitly listed, or also includes inherent elements in such article or terminal device. In the absence of any further restrictions, the element defined by the phrase "includes a . . . " does not exclude other same elements in the process, the method, the article, or the terminal device that includes the element.

The above describes a method for modeling based on random forest and a device for modeling based on random forest provided by the present disclosure in detail. In this context, examples are used to explain principles and example embodiments of the present disclosure. The above descriptions of example embodiments are only used to help understand the method of the present disclosure. At the same time, for a person of ordinary skill in the art, according to the idea of the present disclosure, there can be changes in example embodiments and the application scope. In view of the above, contents of the specification should not be construed as limitations of the present disclosure.

The present disclosure may further be understood with clauses as follows.

Clause 1. A method for training model based on random forest, characterized in that the method comprises:
dividing worker nodes into one or more groups;
performing, by the worker nodes in each group, random sampling in preset sample data to obtain target sample data; and
training, by the worker nodes in each group, one or more decision tree objects using the target sample data.

Clause 2. The method according to clause 1, characterized in that the worker nodes in each group include one or more first worker nodes and one or more second worker nodes;
the step of performing, by the worker nodes in each group, random sampling in the preset sample data to obtain the target sample data includes:
reading, by each first worker node in each group, part of sample data in the preset sample data; and
randomly distributing, by each first worker node, the read part of sample data to each second worker node,
wherein the sample data distributed to the second worker node serve as the target sample data.

Clause 3. The method according to clause 2, characterized in that the step of training, by the worker nodes in each group, one or more decision tree objects using the target sample data includes:
training, by each second worker node in each group, a decision tree object using the target sample data.

Clause 4. The method according to clause 1, 2, or 3, characterized in that the step of training, by the worker nodes in each group, one or more decision tree objects using the target sample data includes:
calculating weight of a value of attribute information when the value of the attribute information of the target sample data is an enumeration value;
sorting the value of the attribute information according to the weight;
calculating a Gini coefficient using the sorted value of the attribute information; and
performing a splitting process on a tree node of the decision tree object according to the Gini coefficient.

Clause 5. The method according to clause 4, characterized in that the step of calculating the weight of the value of the attribute information includes:
calculating frequency of the value of the attribute information with respect to a classification column when the classification column of the attribute information is dichotomous; and
normalizing the frequency to obtain the weight.

Clause 6. The method according to clause 4, characterized in that the step of calculating the weight of the value of the attribute information includes:
calculating a weight probability matrix of the value of the attribute information with respect to the classification column when the classification column of the attribute information is multi-classified, wherein an abscissa of the weight probability matrix is the value of the attribute information, and an ordinate is the value of the classification column;
performing principal component analysis on the weight probability matrix to obtain an eigenvector corresponding to a maximum eigenvalue; and
multiplying the weight probability matrix by the eigenvector to obtain the weight.

Clause 7. The method according to clause 4, characterized in that the step of calculating the Gini coefficient using the sorted value of the attribute information includes:
dividing the sorted value of the attribute information into two attribute subsets according to an order of sorting; and
calculating the Gini coefficient using the two attribute subsets in sequence.

Clause 8. An apparatus for training model based on random forest, characterized in that the apparatus comprises:
a group dividing module, configured to divide the worker nodes into one or more groups;
a random sampling module, configured to perform, by the worker nodes in each group, random sampling in the preset sample data to obtain target sample data; and
a decision tree training module, configured to train, by the worker nodes in each group, one or more decision tree objects using the target sample data.

Clause 9. The apparatus according to clause 8, characterized in that the worker nodes in each group include one or more first worker nodes and one or more second worker nodes;

the random sampling module includes:
a partial data reading submodule, configured to read, by each first worker node in each group, part of sample data in the preset sample data; and
a random data distribution submodule, configured to randomly distribute, by each first worker node, the read part of the sample data to each second worker node, wherein the sample data distributed to the second worker node serve as the target sample data.

Clause 10. The apparatus according to clause 9, characterized in that the decision tree training module includes:
a node training submodule, configured to train, by each second worker node in each group, a decision tree object using the target sample data.

Clause 11. The apparatus according to clause 8, 9, or 10, characterized in that the decision tree training module includes:
a weight calculation submodule, configured to calculate, weight of attribute information when a value of the attribute information of the target sample data is an enumerated value;
a sorting submodule, configured to sort the value of the attribute information according to the weight;
a Gini coefficient calculation submodule, configured to calculate a Gini coefficient using the sorted value of the attribute information; and
a splitting submodule, configured to perform a splitting process on a tree node of the decision tree object according to the Gini coefficient.

Clause 12. The apparatus according to clause 11, characterized in that the weight calculation submodule includes:
a frequency calculation unit, configured to calculate frequency of the value of the attribute information with respect to a classification column when the classification column of the attribute information is dichotomous; and
a normalization unit, configured to normalize the frequency to obtain the weight.

Clause 13. The apparatus according to clause 11, characterized in that the weight calculation submodule includes:
a weight probability matrix calculation unit, configured to calculate a weight probability matrix of the value of the attribute information with respect to the classification column when the classification column of the attribute information is multi-classified, wherein an abscissa of the weight probability matrix is the value of the attribute information, and an ordinate is the value of the classification column;
a principal component analysis unit, configured to perform principal component analysis on the weight probability matrix to obtain an eigenvector corresponding to a maximum eigenvalue; and
a weight obtaining unit, configured to multiply the weight probability matrix by the eigenvector to obtain the weight.

Clause 14. The apparatus according to clause 11, characterized in that the Gini coefficient calculation submodule includes:
a subset dividing unit, configured to divide the sorted value of the attribute information into two attribute subsets according to an order of sorting; and
a subset calculation unit, configured to calculate the Gini coefficient using the two attribute subsets in sequence.

What is claimed is:
1. A method for training a model based on random forest, comprising:
dividing, by a computer system, computer worker nodes of the computer system into a first group of first computer worker nodes and a second group of second computer worker nodes;
obtaining, by each of the first computer worker nodes, a subset of sample data;
distributing, by each of the first computer worker nodes, the obtained subset of sample data to the second computer worker nodes based on random sampling;
obtaining, by each of one or more of the second computer worker nodes, target sample data from the random sampling; and
training, by each of the one or more second computer worker nodes, one or more decision tree objects of the model based on random forest using the target sample data, wherein the training comprises:
calculating a frequency of a value of attribute information of each sample object of the target sample data with respect to a classification column, wherein the classification column of the attribute information is dichotomous;
normalizing the frequency to obtain a weight of the value of the attribute information of each sample object of the target sample data;
sorting the value of the attribute information according to the weight;
calculating a Gini coefficient using the sorted value of the attribute information; and
performing a splitting process on a tree node of a decision tree object of the one or more decision tree objects according to the Gini coefficient.

2. The method according to claim 1, wherein the first group of first computer worker nodes are Map nodes and the second group of second computer worker nodes are Reduce nodes.

3. The method according to claim 1, wherein distributing the obtained subset of sample data to the second computer worker nodes based on random sampling comprises:
for each of the second group of second computer worker nodes, distributing or not distributing the obtained subset of sample data in a random manner.

4. The method according to claim 1, wherein the training, by each of the one or more second computer worker nodes, one or more decision tree objects of the model based on random forest using the target sample data includes:
training, by each of the one or more second computer worker nodes, a decision tree of a random forest of the model using the target sample data.

5. The method according to claim 1, wherein the calculating the Gini coefficient using the sorted value of the attribute information includes:
dividing the sorted value of the attribute information into two attribute subsets according to an order of the sorting; and
calculating the Gini coefficient using the two attribute subsets in sequence.

6. A computer system, comprising:
one or more processors; and
one or more memories storing thereon computer-readable instructions that, when executed by the one or more processors, cause the one or more processors to perform operations comprising:
dividing computer worker nodes of the computer system into a first group of first computer worker nodes and a second group of second computer worker nodes;
obtaining, at each of the first computer worker nodes, a subset of sample data;
distributing, at each of the first computer worker nodes, the obtained subset of sample data to the second computer worker nodes based on random sampling;

obtaining, at each of one or more of the second computer worker nodes, target sample data from the random sampling; and training, at each of the one or more second computer worker nodes, one or more decision tree objects of a model based on random forest using the target sample data, wherein the training comprises:

calculating a frequency of a value of attribute information of each sample object of the target sample data with respect to a classification column, wherein the classification column of the attribute information is dichotomous;

normalizing the frequency to obtain a weight of the value of the attribute information of each sample object of the target sample data;

sorting the value of the attribute information according to the weight;

calculating a Gini coefficient using the sorted value of the attribute information; and performing a splitting process on a tree node of a decision tree object of the one or more decision tree objects according to the Gini coefficient.

7. The computer system according to claim 6, wherein the first group of first computer worker nodes are Map nodes and the second group of second computer worker nodes are Reduce nodes.

8. The computer system according to claim 6, wherein distributing the obtained subset of sample data to the second computer worker nodes based on random sampling comprises:

for each of the second group of second computer worker nodes, distributing or not distributing the obtained subset of sample data in a random manner.

9. The computer system according to claim 6, wherein:

the computer system is a single computer, and each of the first group of first computer worker nodes and the second group of second computer worker nodes is a core of a Central Processing Unit; or the computer system is a computer cluster, and each of the first group of first computer worker nodes and the second group of second computer worker nodes is a single computer.

10. The method according to claim 1, wherein:

the computer system is a single computer, and each of the first group of first computer worker nodes and the second group of second computer worker nodes is a core of a Central Processing Unit; or the computer system is a computer cluster, and each of the first group of first computer worker nodes and the second group of second computer worker nodes is a single computer.

11. One or more non-transitory computer-readable storage media of a computer system, the non-transitory computer-readable storage media storing instructions that, when executed by one or more processors, cause the one or more processors to perform operations comprising:

dividing computer worker nodes of the computer system into a first group of first computer worker nodes and a second group of second computer worker nodes;

obtaining, at each of the first computer worker nodes, a subset of sample data;

distributing, at each of the first computer worker nodes, the obtained subset of sample data to the second computer worker nodes based on random sampling;

obtaining, at each of one or more of the second computer worker nodes, target sample data from the random sampling; and training, at each of the one or more second computer worker nodes, one or more decision tree objects of a model based on random forest using the target sample data, wherein the training comprises:

calculating a frequency of a value of attribute information of each sample object of the target sample data with respect to a classification column, wherein the classification column of the attribute information is dichotomous;

normalizing the frequency to obtain a weight of the value of the attribute information of each sample object of the target sample data;

sorting the value of the attribute information according to the weight;

calculating a Gini coefficient using the sorted value of the attribute information; and performing a splitting process on a tree node of a decision tree object of the one or more decision tree objects according to the Gini coefficient.

12. The one or more non-transitory computer-readable storage media according to claim 11, wherein the first group of first computer worker nodes are Map nodes and the second group of second computer worker nodes are Reduce nodes.

13. The one or more non-transitory computer-readable storage media according to claim 11, wherein distributing the obtained subset of sample data to the second computer worker nodes based on random sampling comprises:

for each of the second group of second computer worker nodes, distributing or not distributing the obtained subset of sample data in a random manner.

14. The one or more non-transitory computer-readable storage media according to claim 11, wherein the calculating the Gini coefficient using the sorted value of the attribute information includes:

dividing the sorted value of the attribute information into two attribute subsets according to an order of the sorting; and calculating the Gini coefficient using the two attribute subsets in sequence.

* * * * *